United States Patent [19]

Kranzlmüller

[11] 4,364,706

[45] Dec. 21, 1982

[54] CARRIER APPARATUS FOR VERTICAL AND HORIZONTAL TRANSPORTATION OF LOADS

[76] Inventor: Reinhard Kranzlmüller, Bahnhofstrasse 28, A 6850 Dornbirn, Vorarlberg, Austria

[21] Appl. No.: 162,742

[22] Filed: Jun. 25, 1980

[51] Int. Cl.$^3$ .................... B66F 9/14; B66F 9/07; B65G 1/04
[52] U.S. Cl. .................... 414/733; 414/283; 414/742; 414/749; 414/911
[58] Field of Search ............. 414/281, 282, 283, 277, 414/732, 733, 742, 749, 751, 911, 917; 242/58.6

[56] References Cited

U.S. PATENT DOCUMENTS

| | | | |
|---|---|---|---|
| 1,766,574 | 6/1930 | Westin et al. | 414/733 |
| 3,363,474 | 1/1968 | Ritter et al. | 414/749 X |
| 3,561,614 | 2/1971 | Tezuka et al. | 414/751 |
| 3,790,001 | 2/1974 | Schnell | 414/917 X |

FOREIGN PATENT DOCUMENTS

| | | |
|---|---|---|
| 1152666 | 8/1963 | Fed. Rep. of Germany . |
| 2123144 | 9/1972 | Fed. Rep. of Germany . |
| 581056 | 11/1977 | U.S.S.R. ................ 414/917 |

Primary Examiner—James L. Rowland
Attorney, Agent, or Firm—Toren, McGeady & Stanger

[57] ABSTRACT

A system for the vertical and horizontal transportation of loads, particularly stored goods to be arranged in storage shelves, is formed with a carrier having preferably a pair of brackets arranged thereon and spaced a horizontal distance from each other, with each of the brackets formed of two rotatably connected arms. One of the arms is a support arm rotatably mounted on the carrier with the second arm being freely cantilevered therefrom. The cantilevered arm is formed at its free end with recesses or the like for engaging the goods to be transported and rotation of the cantilevered arm is determined in dependence upon rotary motion of the support arm. The arrangement makes it possible to lift a load in a simple manner and to shift the load through an approximately horizontal path by relative rotation of the arms of the brackets as a result of which spacing between adjacent storage shelves may be maintained very narrow while enabling goods to be transported therebetween.

7 Claims, 4 Drawing Figures

U.S. Patent  Dec. 21, 1982  Sheet 2 of 2  4,364,706
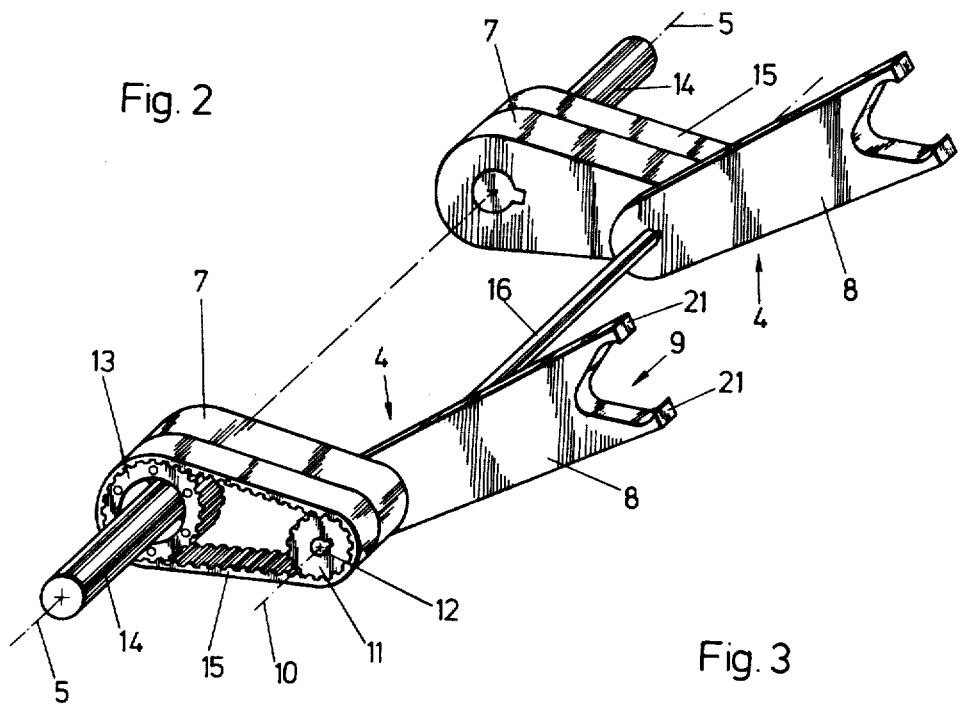
Fig. 2
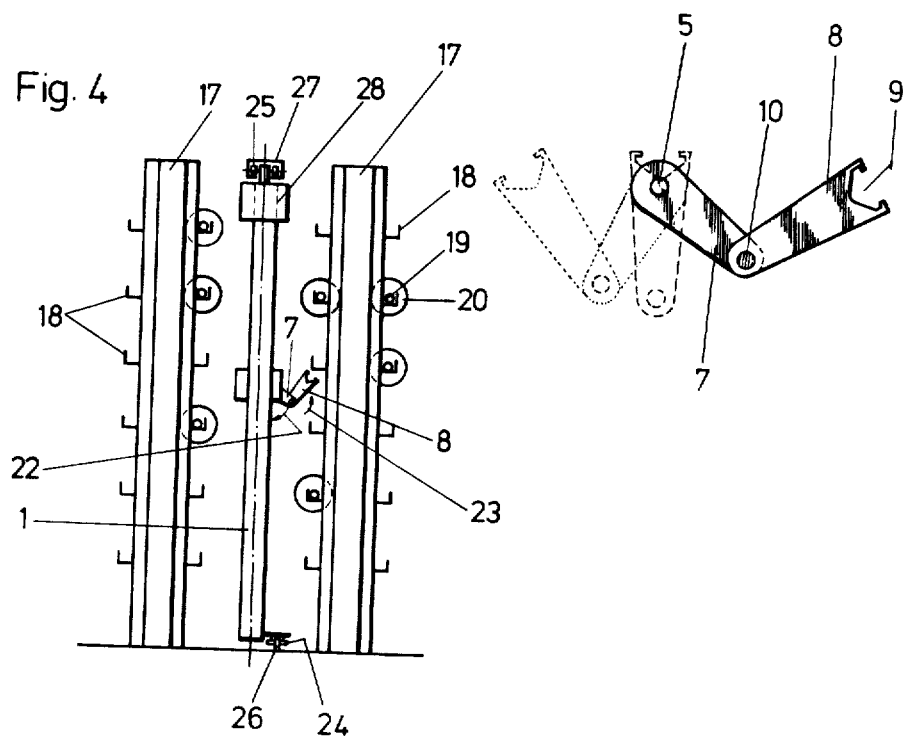
Fig. 3
Fig. 4

CARRIER APPARATUS FOR VERTICAL AND HORIZONTAL TRANSPORTATION OF LOADS

The present invention relates generally to conveying devices for transporting loads and more particularly to a system for the vertical and horizontal displacement of loads such as stored goods which are to be arranged in storage shelves.

Various systems are known for use in storekeeping and the like. As a rule, horizontally and vertically adjustable cabins are provided for this type of storekeeping from which the shelves may be attended. However, in such a case, difficulties arise where heavy stored goods are to be placed in or lifted from storage spaces.

The present invention is directed to the task of providing an arrangement of the type described above which makes it possible to manipulate in a simple manner stored goods which would otherwise be relatively difficult to manipulate. Moreover, the arrangement of the invention is suitable for altering the vertical and horizontal positions of loads of various types within or outside of storage shelves.

SUMMARY OF THE INVENTION

Briefly, the present invention may be described as apparatus for the transportation of storage goods, particularly for arranging goods on storage shelves, comprising carrier means, bracket means vertically adjustably supported in the carrier means with the bracket means comprising a first arm rotatably mounted on said carrier means for rotation relative thereto about an approximately horizontal axis and a cantilevered second arm having a first end pivotally connected to the first arm for rotation about an approximately horizontal axis and a second free end wherein there is formed means for engaging the goods to be transported. The apparatus also comprises drive means for effecting rotation of the bracket means with the cantilevered second arm being rotated relative to the first arm in dependence upon the rotary motion of the first arm.

In accordance with the invention, the desired results are achieved in that at least one bracket is provided which is supported so as to be rotatable about an approximately horizontal axis with the bracket being formed of the two arms which are connected to each other so as to be rotatable about an approximately horizontal axis. The bracket is vertically adjustably supported in the carrier and it is equipped with a drive device. The means for engaging the goods may comprise recesses, indentations projections or the like and the freely cantilevered second arm of the bracket is rotated relative to the first arm which is supported on the carrier so that the motion and position of the second arm may be controlled in dependence upon the rotary motion of the first arm.

As a result of measures taken in accordance with the present invention, a load may initially be lifted from a storage shelf or from another location whereupon by a simple rotary motion acting upon the bracket an at least approximately horizontal motion of the goods may be effected. This is due to the fact that the two arms of the bracket will change their relative angular positions in a particular relationship relative to each other. As a result, it is also possible to dimension relatively narrow spacing between adjacent storage shelves so that a storage room may be utilized with greater efficiency. The stored goods may be moved laterally to such an extent that the goods will be practically in the central region of the carrier supporting the bracket so that only very little space is required. Additionally, an arrangement of this type can be utilized to operate toward both sides thereof because when the bracket is further rotated the freely cantilevered arm swings toward the other side. Such an arrangement may be used in various applications and is not only advantageous in operation but it is additionally practically maintenance free inasmuch as a small number of components are required and a particularly sturdy construction may be provided.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIG. 2 is a perspective view of the more essential components of the bracket of the invention;

FIG. 3 is a side view showing the bracket in three different positions; and

FIG. 4 is an elevational view showing possible arrangements for utilizing the apparatus of the invention in connection with the storage shelves.

DETAILED DESCRIPTION OF THE PREFERRED EMBODIMENT

Figure 1:
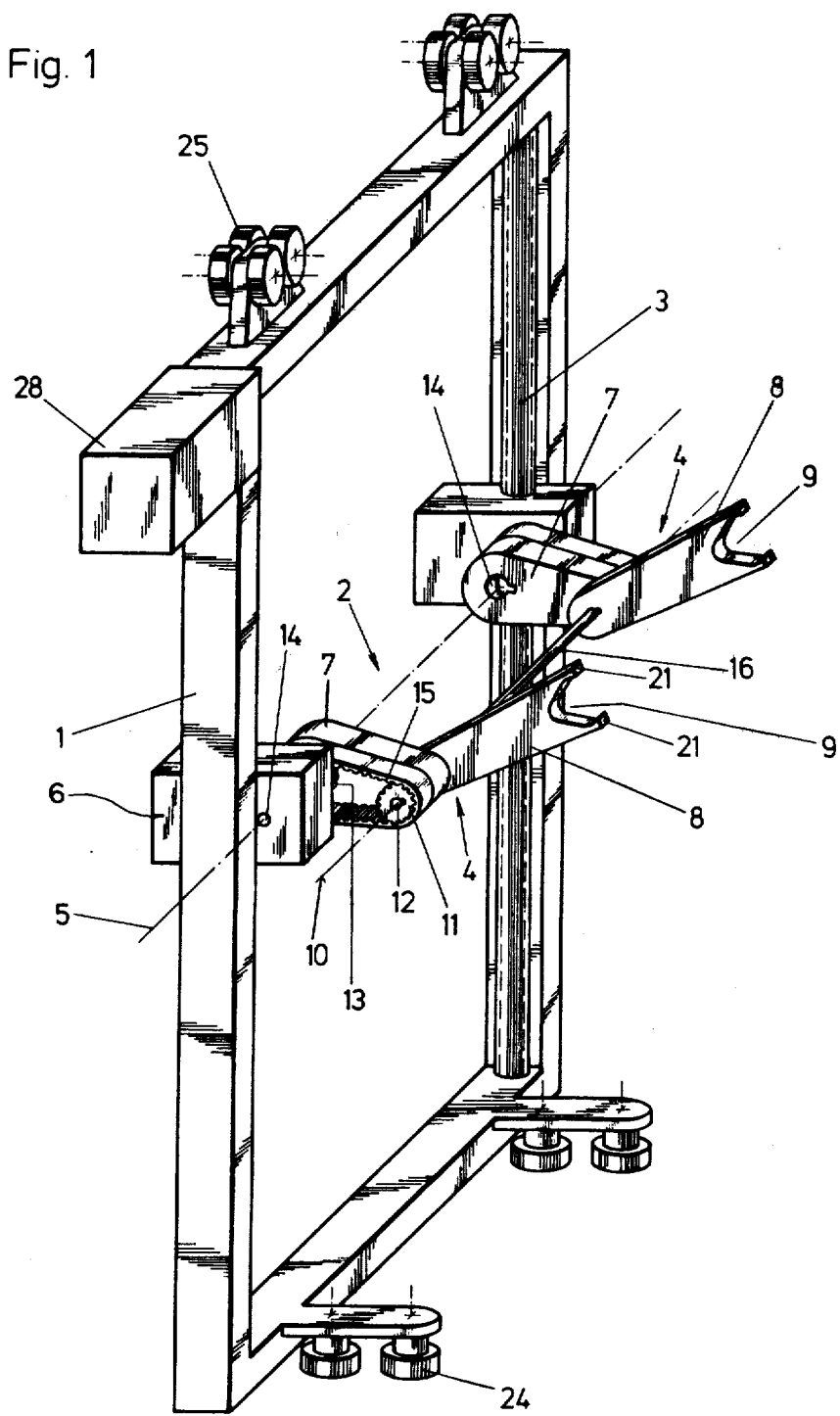
FIG. 1 is a perspective view showing an arrangement in accordance with the present invention wherein two brackets are arranged in spaced relationship and supported upon a carrier.

Referring now to the drawings wherein similar reference numerals are used to refer to like parts throughout the various figures thereof, apparatus in accordance with the present invention is depicted in FIG. 1 as composed of a carrier frame 1 wherein a lifting device 2 is vertically adjustably supported. The vertical adjustment may be effected, for example, by means of driven spindles 3 which are advantageously assigned to the two vertical members of the carrier 1.

The lifting device itself is composed of two brackets 4 which are arranged in a spaced relationship relative to each other and which are rotatable upon a support member 6 about an approximately horizontal axis 5. Each bracket 4 is composed of a first arm 7 and of a second freely cantilevered arm 8. The freely cantilevered arm has at its free end recesses 9 which operate to engage the goods to be stored. The recesses 9 may also be formed as indentations or projections.

A special embodiment according to the invention involves an arrangement wherein the freely cantilevered arms 8 of the brackets 4 may be rotated relative to the first arms 7 in dependence upon the rotary motion of the first arms 7. For this purpose, on the freely cantilevering arm 8 of the bracket 4, there is arranged a second drive element comprised of a gear 11 located in the region of its axis of rotation 10, which gear is fixedly connected to the arm 8. For reasons of construction, the first arm 7 engages between the gear 11 and the arm 8. Accordingly, these two components are connected to one another through an axle 12.

Furthermore, a first drive element comprising another gear 13 is arranged so that its axis will coincide with the axis of rotation 5 of the first lever 7. The gear 13 is rigidly attached to the corresponding support member 6. Accordingly, the gear 13 cannot move relative to the support member 6.

The arm 7 extends through the gear 13 by means of an axle bolt 14 and it engages in a bearing on the support member 6. The axle bolt 14 is further coupled to a drive member which is arranged within the support member 6. In order to insure complete synchronism between the two brackets 4, the drive means may be provided in both support members 6. The two aforementioned members 11 and 13 are in operative connection with each other through an interconnecting element comprising a toothed belt or chain 15. The first drive element 13, the second drive element 11 and the interconnecting element 15 comprise gear means interposed between the first and second arm means and it will be apparent that many structural modifications thereof may be provided within the knowledge of those skilled in the art.

When the axle bolt 14 and thus the first arm 7 are driven with the gear 13 being stationery, the gear 11 must roll on the toothed belt 15 and this therefore results in relative motion between the arm 8 and the arm 7. The transmission may be selected in such a way that the freely cantilevered end of the arm 8 will always be in the same vertical position relative to the support member 6 so that an exact horizontal movement of a transported load will be possible. It is within the scope of the invention to provide other drive elements instead of the gears 11 and 13 and to effect operative interconnection therebetween through other means. For example, another gear could be provided between the gears 11 and 13 instead of the toothed belt 15 with this gear being rotatably supported on the arm 7. It would also be possible to provide chain wheels as the drive elements which would then be connected through a chain mechanism.

In order to obtain the best possible synchronism between the two brackets 4, the two freely cantilevered arms 8 of the brackets 4 may be additionally connected to each other in a rigid manner by means of a connecting rail 16. The connecting rail 16 may be advantageously arranged in the region of the axes of rotation of the arms 8. In this connection it is also possible to assign the drive means for the brackets to this connecting rail 16 whereby the axle bolt 14 would then engage the support members 6 only for bearing purposes. By rotating the connecting rail 16, the gear 11 will then also be driven so that the arm 7 may swing about the axis 5 by means of the toothed belt 15 or by other appropriate means.

It has already been mentioned that the arrangement in accordance with the invention may be used for storekeeping as well as for other applications. For example, it would be conceivable to provide one bracket 4 only by means of which appropriate lifting and shifting procedures could be effected. In this regard it will be particularly seen from FIG. 3 that the stored goods attached to the freely cantilevered arm 8 may be shifted in a horizontal direction by swinging of the bracket 4. Thus, it is possible to effect shifting operations which may be performed very exactly.

FIG. 4 shows a possibility for using the arrangement shown in FIG. 1. In this case, storage racks 17 are provided having vertical support members which are provided with hooked projections 18 wherein there are placed cylindrical bodies 20 which are provided with axle journals 19. It would be possible to store the cylindrical bodies 20 in a relatively narrow space. For this purpose, it is also necessary that the space between the storage racks 17 may be narrowly dimensioned. It this case, an arrangement in accordance with the present invention is particularly advantageous inasmuch as the bodies 20 which are to be stored may be transported into the region between the vertical members of the carrier and they may be then moved in the longitudinal directional by the racks by means of the carrier 1.

The brackets 4 approach the region beneath the axle journal 19 of the stored bodies. Subsequently, the support member 6 of the brackets 4 are raised. The axle journals 19 are then engaged by the projections 21 of the arms 8 remaining laterally within the recesses 9 and being then lifted out of the hooked projections 18.

Subsequently, rotary motion of the arms 7 and 8 is commenced whereby the arm 7 will swing downwardly in the direction of arrow 22 and the arm 8 will swing upwardly in the direction of arrow 23 with the appropriate dependency between the motion of the two arms being maintained.

As a result, a balance of the swinging movements is provided so that the stored goods, i.e. the cylindrical bodies 20 in this case, will be pulled out of the storage racks 17 in an appropriately horizontal position.

As soon as the two arms 7 and 8 of the bracket 4 are in an approximately vertical position relative to each other, the carrier 1 may be moved in the longitudinal direction of the storage racks 17 so that the stored goods removed from the racks may be appropriately transported.

Depending upon the loads to be transported, the free end of the cantilevered arm may of course by constructed differently. For example, this free end could also be provided with hooked projections, an eye, a load hook or the like. When used in storage racks, the arrangement in accordance with the invention is particularly suitable for storage of pressure rollers or printing rollers or of carpeting material which is wound into rolls. Accordingly, the best possibilities for use are those wherein particularly elongated items or other elongated material must be stored or conveyed.

FIGS. 1 and 4 show possibilities for guiding the carrier 1 wherein rollers 24, 25 provided on the carrier are movably guided in appropriate rails 26 and 27. The carrier 1 is further provided with a boxed container 28 which may receive a battery for a drive element of the vertical drive means and for movement of the bracket 4. Of course, it is also possible to utilize other drive devices such as, for example, contact lines or the like.

While a specific embodiment of the invention has been shown and described to illustrate the application of the inventive principles, it will be understood that the invention may be embodied otherwise without departing from such principles.

What is claimed is:

1. Apparatus for transporting articles including carrier means and bracket means, said bracket means comprising:
first arm means having a first end mounted for pivotal motion relative to said carrier means about a first generally horizontal pivot axis and a second end opposite said first end;
second arm means mounted at one end thereof to said second end of said first arm means for pivotal motion relative thereto about a second generally horizontal pivot axis;

said second arm means having at the other end thereof opposite said one end engaging means for enabling said articles which are to be transported to be held at said other end of said second arm means;

drive means for driving said first arm means to effect pivotal motion thereof about said first pivot axis;

interconnecting drive means operatively engaged between said first arm means and said second arm means to effect pivotal motion of said second arm means relative to said first arm means about said second pivot axis;

said interconnecting drive means including
- a first drive element mounted for rotation with said first arm means,
- a second drive element connected with said second arm means, and
- an interconnecting element for effecting rotation of said second drive element upon rotation of said first drive element;

said interconnecting drive means being structured and dimensioned to maintain said other end of said second arm means moving along a path which is substantially linear and horizontal relative to said first pivot axis and which extends substantially perpendicular to said first pivot axis;

said apparatus further comprising means for moving said bracket means vertically upwardly and downwardly upon said carrier means.

2. Apparatus according to claim 1 wherein said second drive element has said second arm means rigidly connected thereto in the region of its axis of rotation, with said first drive element being arranged so that its axis coincides with said first pivot axis of said first arm means wherein said drive elements are in operative connection.

3. Apparatus according to claim 2 wherein said first and second drive elements are constructed as gears and are in operative connection through said interconnecting element.

4. Apparatus according to claim 1 wherein said first arm means includes an axle supported in said carrier means and wherein said drive means includes a drive member assigned to said first arm means of said bracket means in the region of said axle.

5. Apparatus according to claim 3 wherein said interconnecting element comprises a toothed belt.

6. Apparatus according to claim 1 wherein said interconnecting drive means comprise intermediate gear means interposed between said first arm means and said second arm means.

7. Apparatus according to claim 1 wherein said first arm means comprise a pair of arms arranged in spaced relationship relative to each other and connected with said means for moving said bracket means vertically upwardly and downwardly and wherein said second arm means comprise a pair of cantilevered arms each being pivotally mounted, respectively, with one of said pair of arms of said first arm means with said pair of cantilevered arms of said second arm means being rigidly connected to each other in the region of said second pivot axis through a connecting rail extending therebetween.

* * * * *